United States Patent [19]
Shaffer

[11] Patent Number: 5,992,726
[45] Date of Patent: Nov. 30, 1999

[54] APPARATUS AND METHOD FOR SETTING WELDING RUN-OFF TABS IN A COIL END JOINER

[75] Inventor: Steve Shaffer, Hudson, Ohio

[73] Assignee: Iron Bay, Hudson, Ohio

[21] Appl. No.: 09/004,685

[22] Filed: Jan. 8, 1998

[51] Int. Cl.$^6$ .............................. B23K 37/00; B23K 1/00; B23K 1/14; B23K 5/22
[52] U.S. Cl. .......................... 228/5.7; 228/4.1; 228/6.1; 228/44.3; 228/49.1; 228/213; 269/42
[58] Field of Search ............................. 228/5.7, 6.1, 4.1, 228/44.3, 47.1, 49.1, 49.4, 46, 212, 213, 147; 269/41, 42

[56] References Cited

U.S. PATENT DOCUMENTS

| | | | |
|---|---|---|---|
| 1,524,056 | 1/1925 | Pritchard . | |
| 3,131,663 | 5/1964 | Lawson | 113/131 |
| 3,190,525 | 6/1965 | Foley et al. | 228/5 |
| 3,247,354 | 4/1966 | Mallett et al. | 219/82 |
| 3,256,319 | 6/1966 | Taylor et al. | 219/83 |
| 3,286,342 | 11/1966 | Seeloff et al. | 29/482 |
| 3,355,077 | 11/1967 | Woodward | 228/5 |
| 3,378,185 | 4/1968 | Wheeler et al. | 228/5 |
| 3,386,640 | 6/1968 | Booher | 228/5 |
| 3,403,883 | 10/1968 | Wheeler et al. | 228/13 |
| 3,610,546 | 10/1971 | McGorry | 242/57.1 |
| 3,618,844 | 11/1971 | Morely et al. | 228/4 |
| 3,632,035 | 1/1972 | Wheeler et al. | 228/4 |
| 3,916,140 | 10/1975 | Clews | 219/100 |
| 3,941,972 | 3/1976 | Toma | 219/97 |
| 3,949,790 | 4/1976 | Rass et al. | 140/112 |
| 4,067,489 | 1/1978 | Ishioka et al. | 228/5.7 |
| 4,129,244 | 12/1978 | Morris | 228/170 |
| 4,286,744 | 9/1981 | Gullotti et al. | 228/125 |
| 4,304,977 | 12/1981 | Hanai et al. | 219/97 |
| 4,367,839 | 1/1983 | Angerer | 228/155 |
| 4,489,229 | 12/1984 | Haessly | 219/100 |
| 4,586,644 | 5/1986 | Raush et al. | 228/5.1 |
| 4,626,655 | 12/1986 | Angerer | 219/121 LC |
| 4,765,532 | 8/1988 | Uomoti et al. | 228/212 |
| 4,840,303 | 6/1989 | Fujii et al. | 228/164 |
| 4,850,522 | 7/1989 | Nichols | 228/159 |
| 4,854,493 | 8/1989 | Fujii et al. | 228/5.7 |
| 4,973,089 | 11/1990 | Wheeler et al. | 228/170 |
| 5,030,313 | 7/1991 | Takeda et al. | 156/380.9 |
| 5,169,051 | 12/1992 | Noe | 228/5.7 |
| 5,172,846 | 12/1992 | Hayashi et al. | 228/5.7 |
| 5,190,204 | 3/1993 | Jack et al. | 228/5.7 |
| 5,605,275 | 2/1997 | Rintala | 228/49.4 |

*Primary Examiner*—Samuel M. Heinrich
*Assistant Examiner*—Kiley Stoner
*Attorney, Agent, or Firm*—Oldham & Oldham Co., L.P.A.

[57] ABSTRACT

Apparatus and method for setting welding run-off tabs in a coil end joiner which includes a support table having a U-channel therein, the U-channel having an opening through a base portion thereof, a left hold down clamp and a right hold down clamp positioned to either side of the U-channel over the support table, a first angled member having an actuator which provides horizontal movement of the first angled member, the first angled member extending upwardly through the opening in the base portion of the U-channel and contacting a corresponding second angled member such that horizontal movement of the first angled member results in vertical movement of the top surface of the second angled member which is parallel to the top surface of the support table. A rear welding run-off tab holder member having a U-channel therein is positioned over the second angled member and includes a rear welding run-off tab clamp which is positioned at a rear end thereof. A forward welding run-off tab holder and copper chill bar member includes a forward welding run-off tab clamp on a forward end thereof. The forward welding run-off tab holder and copper chill bar member is positioned in the U-channel in the rear welding run-off tab holder member. The apparatus and method for setting welding run-off tabs in a coil end welder facilitates the positioning of and retains a rear welding run-off tab and a forward welding run-off tab in position until the coil end welding operation is completed.

19 Claims, 3 Drawing Sheets

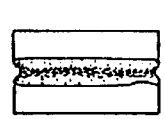
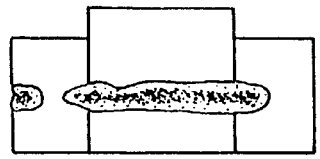
FIG.-1   FIG.-2
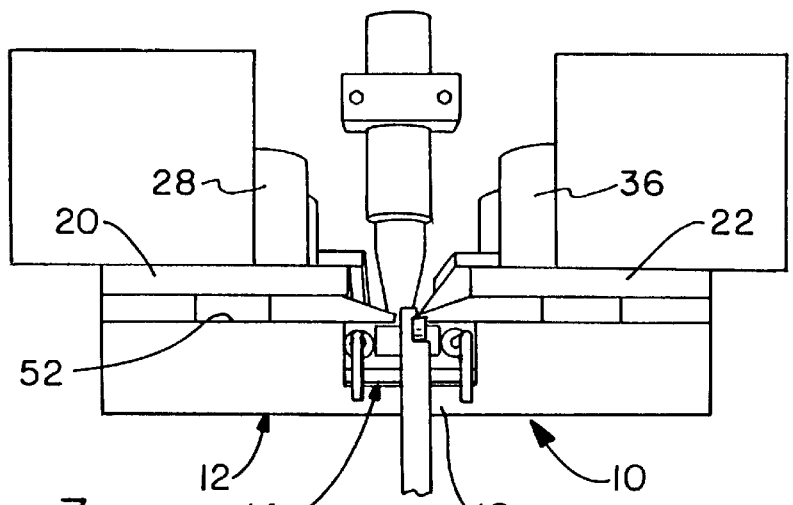
FIG.-3
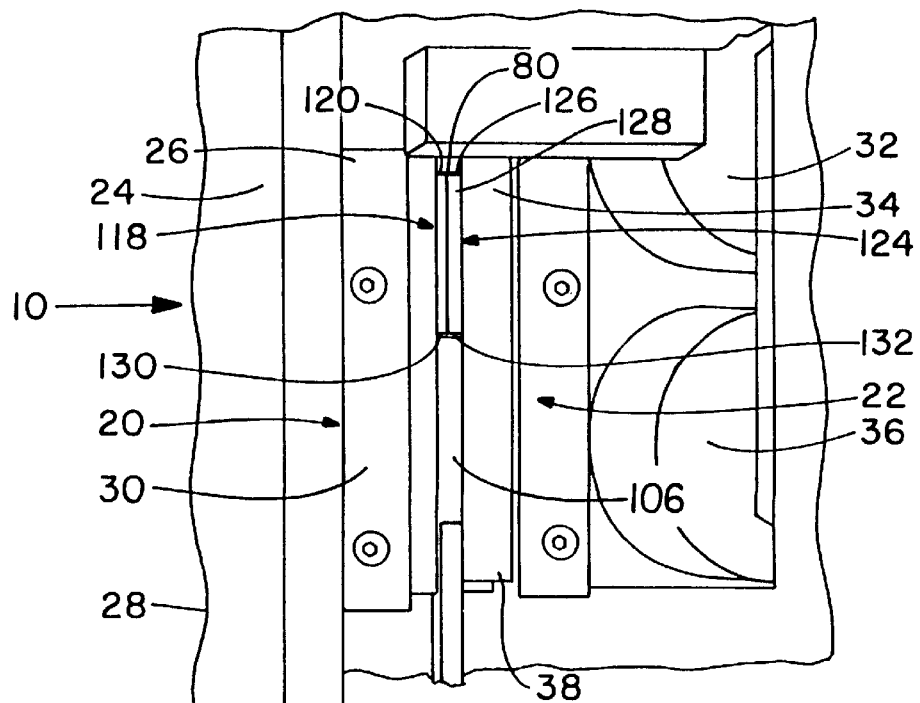
FIG.-4

APPARATUS AND METHOD FOR SETTING WELDING RUN-OFF TABS IN A COIL END JOINER

BACKGROUND AND SUMMARY OF THE INVENTION

The present invention relates generally to an apparatus and method for setting welding run-off tabs in a coil end joiner. More particularly, the present invention relates to an apparatus and method for setting welding run-off tabs in a coil end joiner which facilitates the positioning of and retains welding run-off tabs in position to provide full edge-to-edge weld penetration in a coil end to coil end weld joint.

In many metalworking operations involving stamping, forming or otherwise processing e metallic material provided in a coil configuration, it is desirable to join the trailing end of a coil about to be depleted with the leading end of a new coil to facilitate the manufacturing operations. For example, if coil material is being fed through a press or some other piece of metalworking equipment, it is often desirable to have an "endless" supply of material to reduce or eliminate the necessity of "rethreading" the coil material when a coil is depleted. In the past, various types of coil end joiners have been used to join the trailing end of a coil about to be depleted with the leading end of a new coil to provide such an "endless" supply of material.

However, many prior art coil end joiners have simply butted up the trailing end of a coil about to be depleted with the leading end of a new coil and have joined the two (2) pieces together, typically using an arc welding process, such as gas tungsten arc welding (GTAW), or perhaps more commonly known as tungsten insert gas (TIG) welding. As seen in FIG. 1, while such a coil end weld joint provides a good weld joint in the central portion of the joined coil ends, either an unwelded edge area, or even more negatively, a semi-circular "blowout" area or cutting-out of the coil end weld joint typically occurs at both the initial side and the terminal side of the weld joint.

While a partial width, not a full edge-to-edge, coil end weld joint could be tolerated in some metalworking operations, other metalworking operations either require or would benefit from full edge-to-edge integrity of the coil end weld joint. For example, a trend in many metalworking operations is to strive to utilize a greater percentage of the raw material in end products and reduce the remaining "skeleton" web of scrap metal as much as possible. Thus, many stamping operations, such as the stamping of motor laminations, utilize either the entire width or substantially the entire width of the coil to fabricate the end product. If such a product is stamped across a coil end weld joint having a semi-circular "blowout" area or cutting-out of the coil end weld joint on either side of the coil, the end product would be defective and, perhaps in most cases, would have to be scrapped. Further, in other metalworking forming operations, such as forming a coil material into an end product having a tubular configuration, all of the coil material is utilized in the end product. Thus, an end product fabricated with a coil end weld joint having a semi-circular "blowout" area or cutting-out of the coil end weld joint would be defective and, in most cases, would have to be scrapped. Furthermore, in some metalworking operations, it is necessary or desirable to maintain a continuous "skeleton" web to, for example, provide for continuous "pull-through" of the "skeleton" web.

In addition to the semi-circular "blowout" area or cutting-out of the weld joint which sometimes occurs at both the initial side and the terminal side of the coil end weld joint, a significant build-up of metallic material typically occurs at the initial side of the weld joint. Such a build-up of metallic material can have a negative effect on subsequent feeding, machining, tooling and/or other manufacturing operations and, if nothing else, is unsightly in a final end product and may necessitate further end product rework and/or repair operations.

In order to provide a full edge-to-edge coil end weld joint, welding run-off tabs, typically fabricated from a material having a composition and a thickness comparable to that of the coil material, have been manually placed on both the initial and the terminal side of the coil end weld joint. Such welding run-off tabs permit the welding arc to begin on the initial welding run-off tab, continue across the coil end weld joint into the terminal welding run-off tab and be extinguished on the terminal welding run-off tab. As seen in FIG. 2, the use of such welding run-off tabs provides a coil weld joint which extends completely from the initial side to the terminal side of the coil end weld joint with no significant semi-circular "blowout" area or cutting-out of the coil end weld joint occurring either at the initial side or the terminal side of the coil end weld joint. Once the coil end weld joint is completed, the welding run-off tabs are removed from the coil end weld joint. The welding run-off tabs can be snapped off by a gloved hand, or in some cases, by using a hand tool, such as a pair of pliers, and a coil end to coil end weld joint is provided having full edge-to-edge weld penetration.

In the past, welding run-off tabs have typically been manually placed on the initial side and the terminal side of the coil end weld joint. Such manual placement of welding run-off tabs takes a significant amount of time and, at the same time, does not always result in a good fit-up or placement of the welding run-off tabs in relation to the coil end weld joint.

Accordingly, an object of the present invention is the provision of an apparatus and method for setting welding run-off tabs in a coil end joiner which facilitates the placement and positioning of an initial welding run-off tab and/or a terminal welding run-off tab in a coil end joiner.

Another object of the present invention is to provide an apparatus and method for setting welding run-off tabs in a coil end joiner which retains an initial welding run-off tab and/or a terminal welding run-off tab in position in relation to a coil end weld joint until the coil end welding process is complete.

Yet another object of the present invention is to provide an apparatus and method for setting welding run-off tabs in a coil end joiner which is economical to fabricate, maintain and use.

These and other objects of the present invention are attained by the provision of an apparatus and method for setting welding run-off tabs in a coil end joiner which includes a support table having a U-channel therein, the U-channel having an opening through a base portion thereof, a left hold down clamp and a right hold down clamp positioned to either side of the U-channel over the support table, a first angled member having an actuator which provides horizontal movement of the first angled member, the first angled member extending upwardly through the opening in the base portion of the U-channel and contacting a corresponding second angled member such that horizontal movement of the first angled member results in vertical movement of the top surface of the second angled member which is parallel to the top surface of the support table. A rear welding run-off tab holder member having a U-channel therein is positioned over the second angled member and includes a rear welding run-off tab clamp which is positioned at a rear end thereof. A forward welding run-off tab holder and copper chill bar member includes a forward welding run-off tab clamp on a forward end thereof. The forward welding run-off tab holder and copper chill bar member is positioned in the U-channel in the rear welding run-off tab holder member. The apparatus and method for setting welding run-off tabs in a coil end welder facilitates the positioning of and retains a rear welding run-off tab and a forward welding run-off tab in position until the coil end welding operation is completed.

Other advantages and novel features of the present invention will become apparent in the following detailed description of the invention when considered in conjunction with the accompanying drawings.

BRIEF DESCRIPTION OF THE DRAWINGS

FIG. 1 is a perspective view of a coil end weld joint made using a gas tungsten arc welding (GTAW) or tungsten inert gas (TIG) welding process without welding run-off tabs showing the semi-circular "blowout" or cutting-out of the coil end weld joint at the initial end and the terminal end of the coil end weld joint.

FIG. 2 is a perspective view of a coil end weld joint made using a gas tungsten arc welding (GTAW) or tungsten inert gas (TIG) welding process with welding run-off tabs showing full edge-to-edge weld penetration of the coil end weld joint.

FIG. 3 is a front view of an apparatus and method for setting welding run-off tabs in a coil end joiner in accordance with a preferred embodiment of the present invention showing the apparatus for setting welding run-off tabs in position for welding in a coil end joiner.

FIG. 4 is a top view of the apparatus and method for setting welding run-off tabs in a coil end joiner in accordance with the preferred embodiment of the present invention shown in FIG. 3 showing the first coil end, the second coil end, the rear welding run-off tab and the forward welding run-off tab in position for welding in a coil end joiner.

DETAILED DESCRIPTION OF THE DRAWINGS

Figure 5:
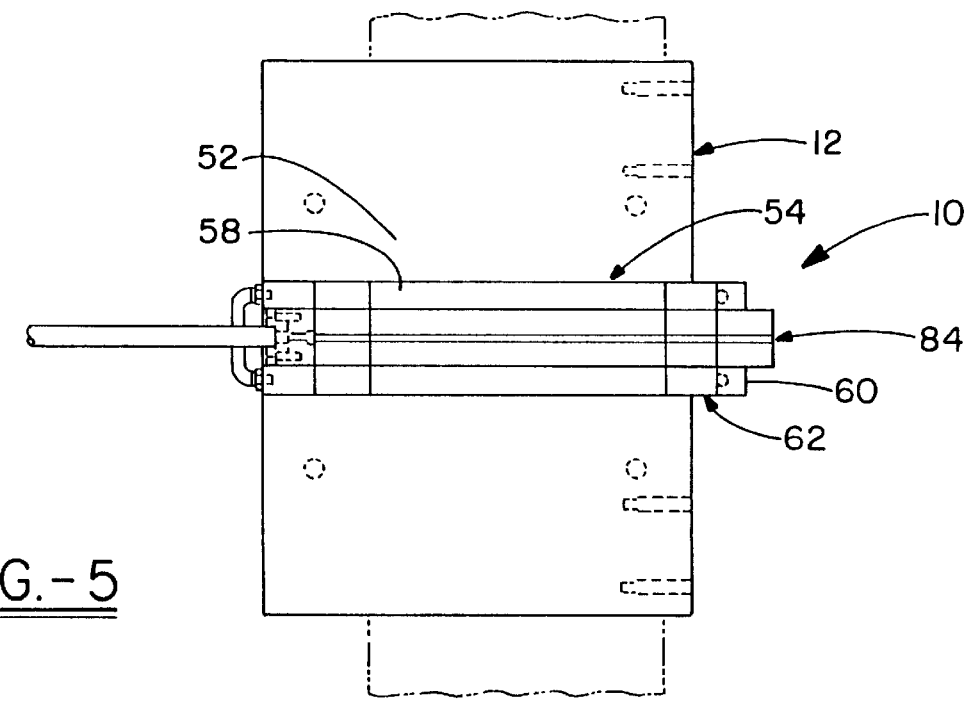
FIG. 5 is a top view of the apparatus and method for setting welding run-off tabs in a coil end joiner in accordance with the preferred embodiment of the present invention shown in FIG. 3.
Figure 6:
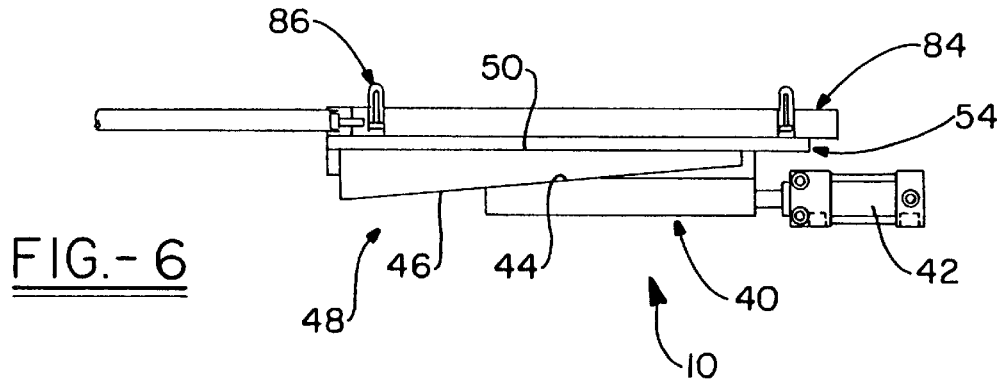
FIG. 6 is a cross-sectional side view of the apparatus and method for setting welding run-off tabs in a coil end joiner in accordance with the preferred embodiment of the present invention shown in FIG. 3.
Figure 7:
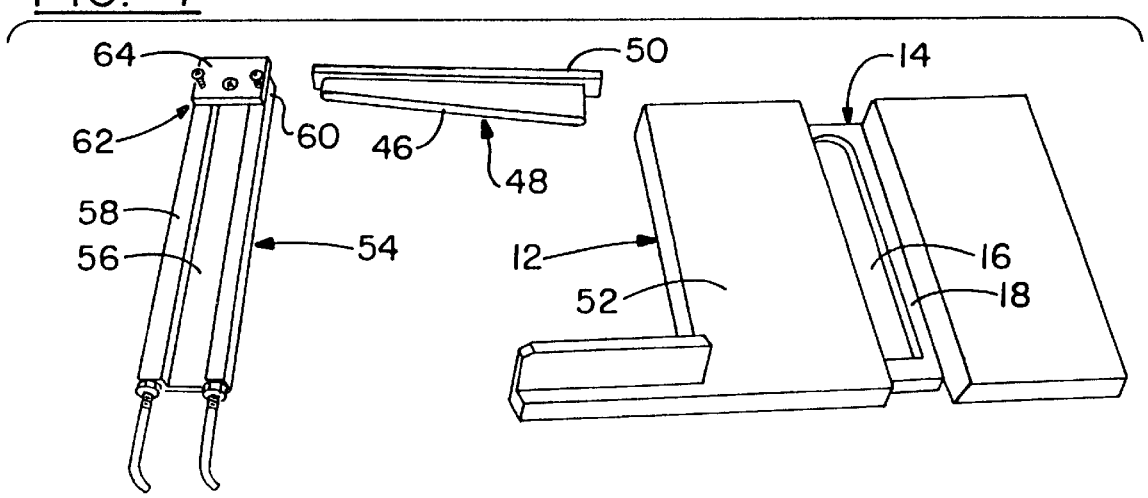
FIG. 7 is a prospective view of various piece parts utilized in the apparatus and method for setting welding run-off tabs in a coil end joiner in accordance with the preferred embodiment of the present invention shown in FIG. 3.
Figure 8:
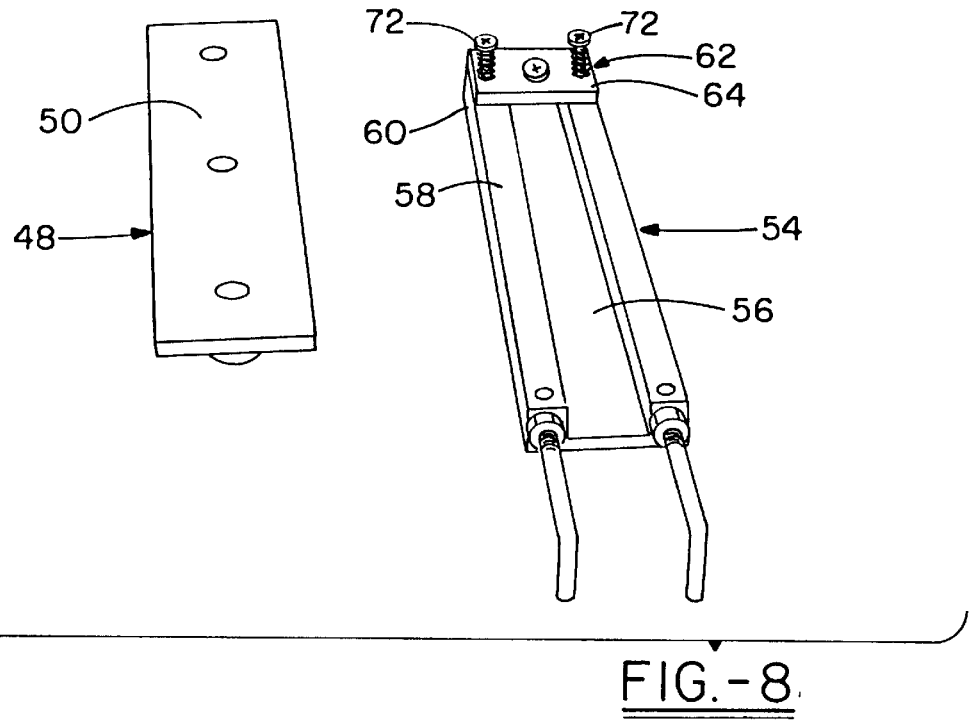
FIG. 8 is a perspective view of the rear welding run-off tab holder member utilized in the apparatus and method for setting welding run-off tabs in a coil end joiner in accordance with the preferred embodiment of the present invention shown in FIG. 3.

In the following detailed description of a preferred embodiment of the present invention, reference is made to the accompanying drawings which, in conjunction with this detailed description, illustrate and describe a preferred embodiment of an apparatus and method for setting welding run-off tabs in a coil end joiner in accordance with the present invention. Referring first to FIG. 3, a front view of an apparatus and method for setting welding run-off tabs in a coil end joiner in accordance with a preferred embodiment of the present invention showing the apparatus for setting welding run-off tabs in a coil end joiner, generally identified by reference numeral 10, is shown in position for welding in a coil end joiner. Apparatus for setting welding run-off tabs in a coil end joiner 10 includes support table 12 having U-channel 14 therein, U-channel 14 having elongated opening 16 through base portion 18 thereof. In addition, apparatus for setting welding run-off tabs in a coil end joiner 10 includes left hold down clamp 20 and right hold down clamp 22 positioned on either side of U-channel 14 over support table 12. Vertical movement for left hold down clamp 20 is preferably provided by first vertical actuator 24 positioned above rear portion 26 of left hold down clamp 20 and second vertical actuator 28 positioned above forward portion 30 of left hold down clamp 20. Use of first, vertical actuator 24 and second vertical actuator 28 permits left hold down clamp 20 to pivot to an angle relative to support table 12 if, for example, materials having different thicknesses are being supported under left hold down clamp 20. In a similar manner, vertical movement for right hold down clamp 22 is preferably provided by third vertical actuator 32 positioned above rear portion 34 of right hold down clamp 22 and fourth vertical actuator 36 positioned above forward portion 38 of right hold down clamp 22. Use of third vertical actuator 32 and fourth vertical actuator 36 permits right hold down clamp 22 to pivot to an angle relative to support table 12 if, for example, materials having different thicknesses are being supported under right hold down clamp 22.

Apparatus for setting welding run-off tabs in a coil end joiner 10 also includes first angled member 40 which is capable of being moved horizontally by horizontal actuator 42. Top angled surface 44 of first angled member 40 extends upwardly through elongated opening 16 through base portion 18 of U-channel 14 in support table 12 and contacts with a corresponding bottom angled surface 46 on second angled member 48 such that horizontal movement of first angled member 40 results in vertical movement of top horizontal surface 50 of second angled member 48. Top horizontal surface 50 of second angled member 48 is preferably substantially parallel to top surface 52 of support table 12.

Figure 9:
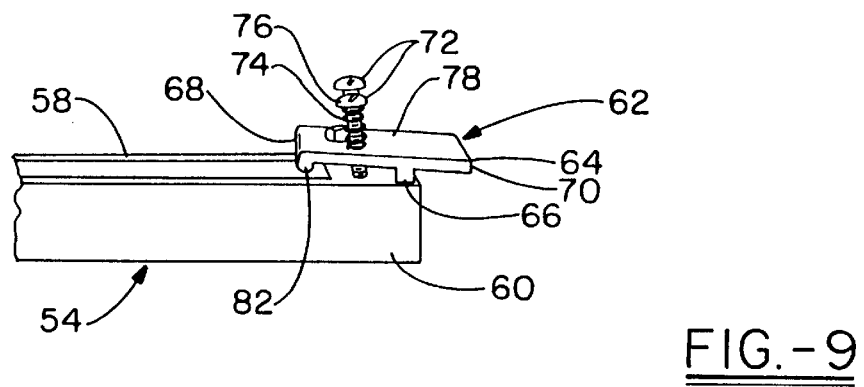
FIG. 9 is a side view of the rear welding run-off tab clamp on the rear end of the rear welding run-off tab holder member utilized in the apparatus and method for setting welding run-off tabs in a coil end joiner in accordance with the preferred embodiment of the present invention shown in FIG. 3.

Apparatus for setting welding run-off tabs in a coil end joiner 10 also includes rear welding run-off tab holder member 54 having U-channel 56 centrally positioned on top surface 58 thereof. Rear welding run-off tab holder member 54 is positioned over second angled member 48 and moves substantially vertically upwardly and downwardly with second angled member 48. Rear portion 60 of top surface 58 of rear welding run-off tab holder member 54 includes rear welding run-off tab clamp 62. As seen in FIG. 9, rear welding tab run-off tab clamp 62 includes rear welding run-off tab holder plate 64 which pivots on downwardly extending leg member 66 positioned intermediate forward portion 68 and rear portion 70 of rear welding run-off tab holder plate 64. Rear welding run-off tab clamp 62 is retained therein by one or more fasteners, in the embodiment shown in FIG. 9, two (2) threaded screws 72 which are received in threaded holes in rear portion 60 of top surface 58 of rear welding run-off tab clamp 62. Coil springs 74 are preferably provided between head portion 76 of threaded screws 72 and top surface 78 of rear welding run-off tab holder plate 64 to provide a downward bias for forward portion 68 of rear welding run-off tab holder plate 64. As seen in FIG. 9, this downward bias for forward portion 68 of rear welding run-off tab holder plate 64 can be readily overcome by pressing downwardly on rear portion 70 of rear welding run-off tab holder plate 64 which pivots rear welding run-off tab holder plate 64 about downwardly extending leg member 66 and lifts forward portion 68 of rear welding run-off tab holder plate 64 to permit insertion of rear welding run-off tab 80 between forward portion 68 of rear welding run-off tab holder plate 64 and top surface 58 of rear portion 60 of rear welding run-off tab holder member 54. Rear welding run-off tab holder plate 64 preferably includes rear welding run-off tab retaining projection 82 extending downwardly from forward portion 68 of rear welding run-off tab holder plate 64 to retain rear welding run-off tab 80 in position between forward portion 68 of rear welding run-off tab holder plate 64 and top surface 58 of rear portion 60 of rear welding run-off tab holder member 54.

Figure 10:
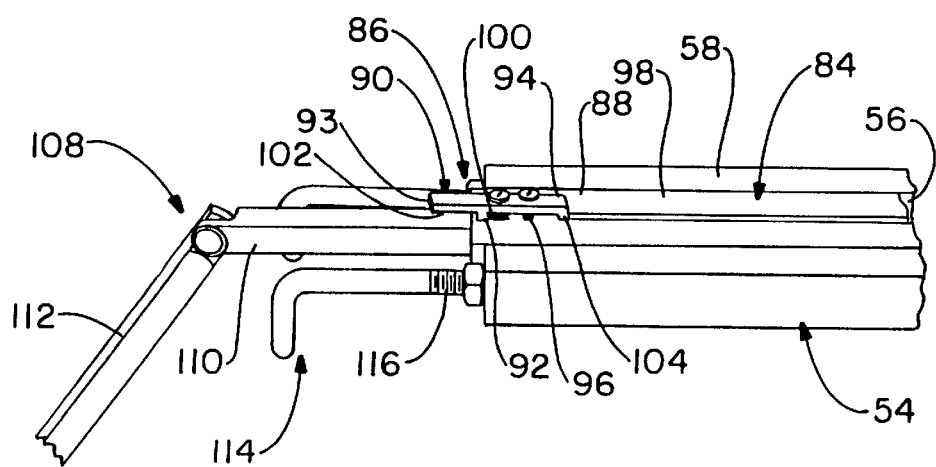
FIG. 10 is a prospective view of the forward welding run-off tab holder and copper chill bar member and the rear welding run-off tab holder member utilized in the apparatus and method for setting welding run-off tabs in a coil end joiner in accordance with the preferred embodiment of the present invention shown in FIG. 3.

Apparatus for setting welding run-off tabs in a coil end joiner 10 also includes forward welding run-off tab holder and copper chill bar member 84 which includes forward welding run-off tab holder clamp 86 mounted on forward portion 88 thereof. As seen in FIG. 10, forward welding tab run-off tab holder clamp 86 includes forward welding run-off tab holder plate 90 which pivots on downwardly extending leg member 92 positioned intermediate forward portion 93 and rear portion 94 of forward welding run-off tab holder plate 90. Forward welding run-off tab holder plate 90 is retained on forward welding run-off tab holder clamp 86 by one or more fasteners, in the embodiment shown in FIG. 10, threaded screw 96 is received in threaded holes in forward portion 88 of top surface 98 of forward welding run-off tab holder and copper chill bar member 84. Coil spring 100 is preferably provided between bottom surface 102 of forward welding run-off tab holder plate 90 and top surface 98 of forward portion 88 of forward welding run-off tab holder and copper chill bar member 84 to provide a downward bias for rear portion 94 of forward welding run-off tab holder plate 90. This downward bias for rear portion 94 of forward welding run-off tab holder and copper chill bar member 84 may be readily overcome by pressing downwardly on forward portion 93 of forward welding run-off tab holder plate 90 which pivots forward welding run-off tab holder plate 90 about downwardly extending leg member 92 and lifts rear portion 94 of forward welding run-off tab holder plate 90 to permit insertion of forward welding run-off tab 106 between rear portion 94 of forward welding run-off tab holder plate 90 and top surface 98 of forward portion 88 of forward welding run-off tab holder and copper chill bar member 84. Forward welding run-off tab holder plate 90 preferably includes forward welding run-off tab retaining projection 104 extending downwardly from rear portion 94 of forward welding run-off tab holder plate 90 to retain forward welding run-off tab 106 in position between rear portion 94 of forward welding run-off tab holder plate 90 and top surface 98 of forward welding run-off tab holder and copper chill bar member 84. As seen in FIG. 10, forward welding run-off tab holder and copper chill bar member 84 is positioned in U-channel 56 of rear welding run-off tab holder member 54. Forward welding run-off tab holder and copper chill bar member 84 preferably includes handle 108 outwardly extending from forward welding run-off tab holder and copper chill bar member 84 to permit forward welding run-off tab holder and copper chill bar member 84 to be moved in a horizontal direction in U-channel 56 in rear welding run-off tab holder member 54. As seen in FIG. 10, handle 108 preferably is a pivotal handle inducing first portion 110 outwardly extending from forward welding run-off tab holder and copper chill bar member 84 and second portion 112 which is pivotally attached at an end of first portion 110 which is distal to forward welding run-off tab holder and copper chill bar member 84. Similarly, rear welding run-off tab holder member 54 preferably includes handle 114, which in the preferred embodiment shown in FIG. 10, includes two (2) outwardly extending right angled threaded members 116 which extend outwardly from rear welding run-off tab holder member 54.

The sequence for loading apparatus for setting welding run-off tabs in apparatus for setting welding run-off tabs in a coil end joiner 10 will now be described. First, rear welding run-off tab 80 is placed under rear welding run-off tab holder plate 64 by pressing down on rear portion 70 of rear welding run-off tab holder plate 64 to retain first welding run-off tab 80 between forward portion 68 of rear welding run-off tab holder plate 64 and top surface 58 of rear portion 60 of rear welding run-off tab holder member 54. Rear welding run-off tab holder member 54 is preferably provided with single point registration of rear welding run-off tab 80 to permit rear welding run-off tab 80 to pivot relative to rear welding run-off tab holder plate 64 to accommodate for any misalignment or dimensional variations of rear welding run-off tab 80 and/or the other parts to be assembled relative thereto.

Next, left hold down clamp 20 and right hold down clamp 22 are placed in their up positions and second angled member 48 is placed in its down position. First coil end 118 is then brought in from one side, in this example, the left side, although the coil end could alternatively be brought first in from the right side, if desired. Rear side surface 120 of first coil end 118 is registered against rear welding run-off tab 80 and end surface 122 of first coil end 118 is aligned under the weld path the welding electrode will travel. When properly positioned, left hold down clamp 20 is lowered to retain first coil end 118 in proper position in apparatus for setting welding run-off tabs in a coil end joiner 10.

Next, second coil end 124 is brought in from the other side, in this example, the right side, and its rear side surface 126 is registered against rear welding run-off tab 80 and its end surface 128 is registered against end surface 122 of first coil end 118. When properly positioned, right hold down clamp 22 is lowered to retain second coil end 124 in proper position in apparatus for setting welding run-off tabs in a coil end joiner 10.

In the preferred embodiment of apparatus for setting welding run-off tabs in a coil end joiner 10 described herein, it is desirable for left hold down clamp 20 and right hold down clamp 22 to hold first coil end 118 and second coil end 124, respectively, against top surface 58 of rear welding run-off tab holder member 54 and have a slight clearance remaining between left hold down clamp 20 and right hold down clamp 22, and first coil end 118 and second coil end 124, respectively, and support table 12.

At this time, second angled member 48 is lowered and forward welding run-off tab holder and copper chill bar member 84 is removed from U-channel 56 in rear welding run-off tab holder member 54. Forward welding run-off tab 106 is placed under forward welding run-off tab holder plate 90 by pressing down on forward portion 93 of forward welding run-off tab holder plate 90 to retain forward welding run-off tab 106 between rear portion 94 of forward welding run-off tab holder plate 90 and top surface 98 of forward welding run-off tab holder and copper chill bar member 84. Forward welding run-off tab holder and copper chill bar member 84 is preferably provided with single point registration of forward welding run-off tab 106 to permit forward welding run-off tab 106 to pivot relative to forward welding run-off tab holder plate 90 to accommodate for any misalignment or dimensional variations between forward welding run-off tab 106 and the first coil end and/or the second coil end.

At this time, forward welding run-off tab holder and copper chill bar member 84 is slid into U-channel 56 in rear welding run-off tab holder member 54 and forward welding run-off tab 106 is registered against forward side surface 130 of first coil end 118 and forward side surface 132 of second coil end 124. Second angled member 48 is then raised to retain rear welding run-off tab 80, first coil end 118, second coil end 124 and forward welding run-off tab 106 in position as shown in FIG. 4 for the coil end welding operation to be carried out.

Once the coil end weld joint is completed, left hold down clamp 20 and right hold down clamp 22 are raised and second angled member 48 is lowered. Forward welding run-off tab holder and copper chill bar member 84 is pulled out of U-channel 56 in rear welding run-off tab holder member 54 and apparatus for setting welding run-off tabs in a coil end joiner 10 is moved away from the welded rear welding run-off tab 80, first coil end 118, second coil end and 124 forward welding run-off tab 106. At this time, a pair of pliers, or some other tool, can be used to remove rear welding run-off tab 80 and forward welding run-off tab 106 and first coil end 118 and second coil end 124 are integrally joined with full edge-to-edge weld penetration.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A coil end joiner for positioning and retaining a fear welding run-off tab and a forward welding run-off tab in relation to a first coil end and a second coil end, said coil end joiner comprising:

a support table having a U-channel therein, said U-channel having an opening through a base portion thereof;

a first hold down clamp positioned to one side of said U-channel in said support table;

a second hold down clamp positioned to the side of said U-channel in said support table distal from said first hold down clamp;

a first angled member having an actuator which provides horizontal movement of said first angled member, said first angled member extending upwardly through said opening in said base portion of said support table;

a second angled member corresponding to said first angled member such that horizontal movement of said first angled member results in vertical movement of a top surface of said second angled member;

a rear welding run-off tab holder which is positioned over said second angled member including a rear welding run-off tab holder clamp to position and retain the rear welding run-off tab in relation to the first coil end and the second coil end; and a forward welding run-off tab holder which is positioned on said rear welding run-off tab holder and includes a forward welding run-off tab holder clamp to position and retain a forward welding run-off tab in relation to the first coil end and the second coil end.

2. The coil end joiner in accordance with claim 1, wherein the first coil end and the second coil end are integrally joined together using an arc fusion welding process and said opening in said base portion of said support table is elongated along the direction of travel of the arc fusion welding electrode.

3. The coil end joiner in accordance with claim 1, wherein said top surface of said second angled member is substantially parallel to a top surface of said support table.

4. The coil end joiner in accordance with claim 1, wherein said rear welding run-off tab holder includes single point registration to permit the rear welding run-off tab to pivot relative to the first coil end and the second coil end to compensate for misalignment and dimensional variations therebetween.

5. The coil end joiner in accordance with claim 4, wherein said forward welding run-off tab holder includes single point registration to permit the forward welding run-off tab to pivot relative to the first coil end and the second coil end to compensate for misalignment and dimensional variations therebetween.

6. The coil end joiner in accordance with claim 1, wherein said forward welding run-off tab holder includes single point registration to permit the forward welding run-off tab to pivot relative to the first coil end and the second coil end to compensate for misalignment and dimensional variations therebetween.

7. A coil end joiner for positioning and retaining a rear welding run-off tab and a forward welding run-off tab in relation to a first coil end and a second coil end, said coil end joiner comprising:

a support table having a U-channel therein, said U-channel having an opening through a base portion thereof;

a first hold down clamp positioned to one side of said U-channel in said support table;

a second hold down clamp positioned to the side of said U-channel in said support table distal from said first hold down clamp;

a first angled member having an actuator which provides horizontal movement of said first angled member, said first angled member extending upwardly through said opening in said base portion of said support table;

a second angled member corresponding to said first angled member such that horizontal movement of said first angled member results in vertical movement of a top surface of said second angled member;

a rear welding run-off tab holder which is slidably received in said U-channel in said support table, said rear welding run-off tab holder is positioned over said second angled member and includes a rear welding run-off tab holder clamp mounted on a rear portion of said rear welding run-off tab holder to position and retain the rear welding run-off tab in relation to the first coil end and the second coil end; and a forward welding run-off tab holder which is positioned on said rear welding run-off tab holder and includes a forward welding run-off tab holder clamp to position and retain a forward welding run-off tab in relation to the first coil end and the second coil end.

8. The coil end joiner in accordance with claim 7, wherein said rear run-off tab holder clamp is mounted on said rear portion of said rear welding run-off tab holder by at least one fastener.

9. The coil end joiner in accordance with claim 8, wherein said rear run-off tab holder clamp includes a rear welding run-off tab holder plate having a downwardly extending leg intermediate a front portion and a rear portion thereof, said front portion of said rear run-off tab holder plate being downwardly biased to retain the rear welding run-off tab between said forward portion of said rear run-off tab holder plate and said rear welding run-off tab holder.

10. The coil end joiner in accordance with claim 9, wherein said rear welding run-off tab holder plate includes a rear welding run-off tab retaining projection downwardly extending from a forward portion thereof.

11. The coil end joiner in accordance with claim 12, wherein said forward welding run-off tab holder is fabricated from a thermally conductive metallic material to act as a welding chill bar and is slidably received in a U-channel in said rear welding run-off tab holder and said forward welding run-off tab holder clamp is mounted on a forward portion thereof.

12. The coil end joiner in accordance with claim 11, wherein said forward run-off tab holder clamp is mounted on a forward portion of said forward welding run-off tab holder by at least one fastener and includes a forward welding run-off tab holder plate having a downwardly extending leg intermediate a front portion and a rear portion thereof, said rear portion of said forward welding run-off tab holder plate being downwardly biased to retain the forward welding run-off tab between said rear portion of said forward welding run-off tab holder plate and said forward welding run-off tab holder.

13. The coil end joiner in accordance with claim 12, wherein said forward welding run-off tab holder plate includes a forward welding run-off tab retaining projection downwardly extending from a rear portion thereof.

14. A coil end joiner for positioning and retaining a rear welding run-off tab and a forward welding run-off tab in relation to a first coil end to a second coil end, said coil end joiner comprising:

a support table having a U-channel therein;

a first hold down clamp positioned to one side of said U-channel in said support table;

a second hold down clamp positioned to the side of said U-channel in said support table distal from said first hold down clamp;

a rear welding run-off tab holder slidably mounted in said U-channel of said support table including a rear welding run-off tab holder clamp to position and retain the rear welding run-off tab in relation to the first coil end and the second coil end; and a forward welding run-off tab holder slidably mounted in relation to said rear welding run-off tab holder including a forward welding run-off tab holder clamp which is positioned on said rear welding run-off tab holder to position and retain a forward welding run-off tab in relation to the first coil end and the second coil end.

15. The coil end joiner in accordance with claim 14, wherein said rear welding run-off tab holder includes single point registration to permit the rear welding run-off tab to pivot relative to the first coil end and the second coil end to compensate for misalignment and dimensional variations therebetween.

16. The coil end joiner in accordance with claim 15, wherein said forward welding run-off tab holder includes single point registration to permit the forward welding run-off tab to pivot relative to the first coil end and the second coil end to compensate for misalignment and dimensional variations therebetween.

17. The coil end joiner in accordance with claim 14, wherein said forward welding run-off tab holder includes single point registration to permit the forward welding run-off tab to pivot relative to the first coil end and the second coil end to compensate for misalignment and dimensional variations therebetween.

18. The coil end joiner in accordance with claim 14, wherein said first hold down clamp is capable of being moved along a substantially vertical axis by a first actuator positioned at a rear portion of said first hold down clamp and by a second actuator positioned at a forward portion of said first hold down clamp to permit said first hold down clamp to pivot relative to said support table to compensate for misalignment and/or dimensional variations.

19. The coil end joiner in accordance with claim 18, wherein said second hold down clamp is capable of being moved along a substantially vertical axis by a third actuator positioned at a rear portion of said second hold down clamp and by a fourth actuator positioned at a forward portion of said second hold down clamp to permit said second hold down clamp to pivot relative to said support table to compensate for misalignment and/or dimensional variations.

\* \* \* \* \*